G. B. BRENNEISEN.
CENTERING MACHINE.
APPLICATION FILED OCT. 16, 1909.
970,679.
Patented Sept. 20, 1910.
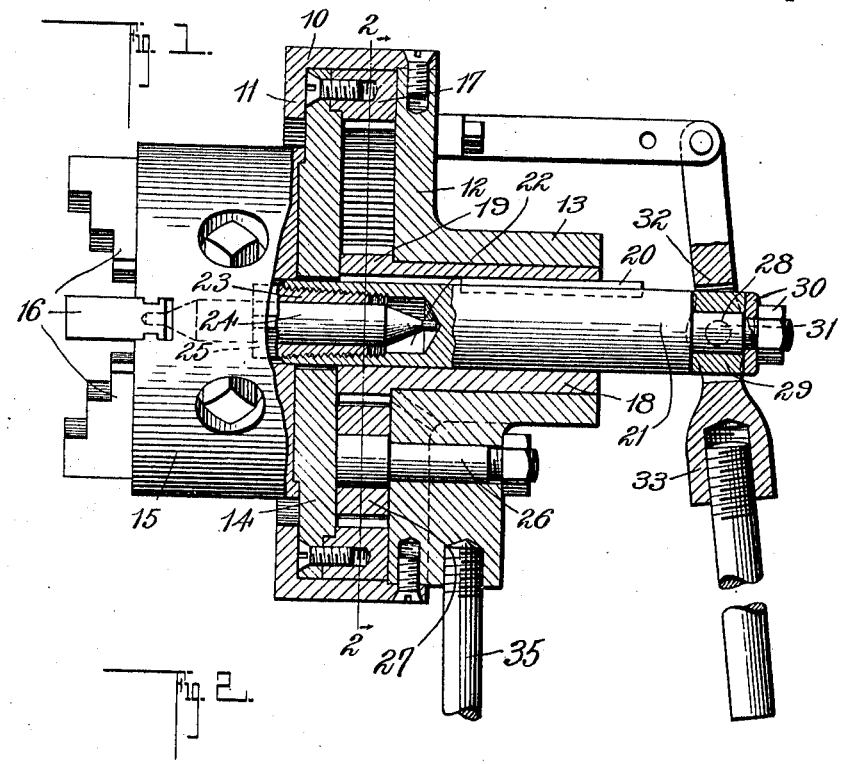
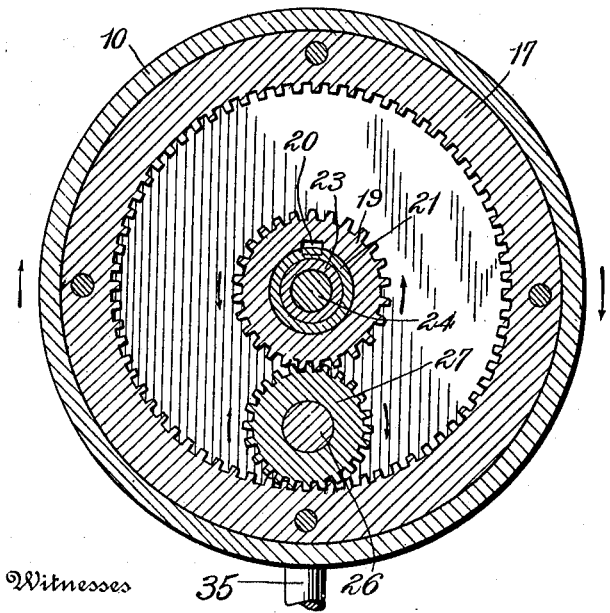
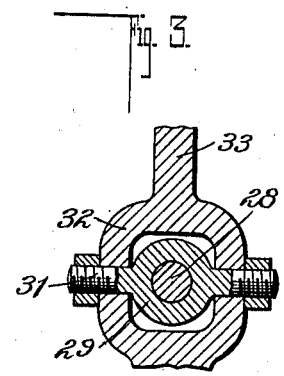
Witnesses
Philip H. Burch
A. R. Walton
Inventor
G. B. Brenneisen,
By
Attorneys

UNITED STATES PATENT OFFICE.

GEORGE B. BRENNEISEN, OF WARREN, PENNSYLVANIA.

CENTERING-MACHINE.

970,679.   Specification of Letters Patent.   Patented Sept. 20, 1910.

Application filed October 16, 1909. Serial No. 523,014.

*To all whom it may concern:*

Be it known that I, GEORGE B. BRENNEISEN, a citizen of the United States, residing at Warren, in the county of Warren and State of Pennsylvania, have invented certain new and useful Improvements in Centering-Machines, of which the following is a specification.

My invention is a centering machine, or more particularly a machine for drilling small center openings in the ends of round, square or other shaped stock preparatory to operating thereon in a lathe, and has for its object to provide a machine wherein the centering drill is rotated in the opposite direction to that of the work, and by the work when the latter is clamped in a lathe chuck or the like.

Other objects, and the advantages of my present invention will appear in the course of the following description, in which reference is made to the accompanying drawing, illustrating my invention and forming a part of this specification, and in which—

Figure 1 is a side view of my improved machine mostly in vertical section. Fig. 2 is a vertical cross-section therethrough on line 2—2 of Fig. 1, and Fig. 3 is a detail, in section, of the connection between the feed lever and the tool spindle.

In the practical embodiment of my invention, I provide a casing ring 10 having at its forward edge an inwardly extending annular flange 11, and connected at its rear edge to a circular plate 12, forming the rear wall of the casing, and provided with a central, rearwardly extending tube 13. Rotatable within ring 10 against its flange 11 is a circular plate 14, to the outer surface of which is secured the work holding chuck 15 having radially movable, key-operated jaws 16, and to the inner surface of which, adjacent its peripheral edge, is secured an internally geared ring 17.

Mounted to rotate within the tube 13 of the rear wall 12, is a sleeve 18 having an externally geared portion 19 between said rear wall 12 and the chuck plate 14, and keyed by a key 20, to a tool spindle 21 projecting therethrough, and through a central opening in said chuck plate 14. The forward end of the tool spindle 21 is provided with a tapering threaded bore 22 for the reception of an externally threaded and tapering tool sleeve 23, by which said sleeve is caused to grip the tool 24 therein. The tool gripping sleeve may have a nut 25 formed upon its outer end, by which it may be manipulated through the chuck 15.

Mounted upon the inner end of a stud shaft 26, locked through the rear wall or plate 12, is a gear wheel 27 arranged between, and intermeshing with, the internally geared ring 17 and the geared portion 19 of the sleeve 18. Thus rotation of the chuck 15, which is caused by clamping the opposite end of the work in a lathe chuck, is communicated to the tool spindle in reverse direction. This results in relative rotation of the drill and work, and in expediting the centering operation, especially in view of the fact that means are provided to advance the tool by longitudinal movement of the tool spindle irrespective of its rotation. This is accomplished by providing the rear end of the tool spindle 21 with a reduced portion 28, and a threaded extremity, the first to receive a rotatable collar 29, and the second to receive a nut and washer 30. The collar 29 has oppositely outstanding studs 31 loosely engaging through transverse openings in the intermediate yoke 32 of a feed lever 33 pivoted at its upper end to a rigid bracket arm 34 outstanding from the rear casing wall or plate 12.

The casing ring 10, rear wall 12 and its tube 13, are prevented from turning, and the entire device steadied during the centering operation, by a hand bar 35 threaded at its inner end radially within a thickened peripheral portion of said rear wall, and which is designed to be grasped by the operator.

I claim:

1. The combination in a centering machine, of a casing embodying a rotatable part, a work-holding chuck secured to said rotatable part, a tool spindle rotatably mounted through said casing, and means between said rotatable part and tool spindle to communicate rotation.

2. The combination in a centering machine, of rotatable work holding means, a rotatable tool spindle, and means connecting the same to communicate rotation therebetween.

3. The combination in a centering machine, of rotatable work holding means, a rotatable tool spindle, gearing connecting said chuck and spindle, and means to move said spindle longitudinally.

4. The combination in a centering machine, of a casing, a hand bar connected thereto to steady and prevent rotation of said casing, rotatable chuck supporting means in said casing, a chuck carried thereby, a tool spindle rotatably mounted in said casing, and gearing supported in said casing between said chuck supporting means and said tool spindle.

In testimony whereof I affix my signature, in presence of two witnesses.

GEORGE B. BRENNEISEN.

Witnesses:
O. W. SCHMAHL,
ARCHIE J. BOWELL.